United States Patent
Hudson et al.

(10) Patent No.: US 8,813,416 B2
(45) Date of Patent: Aug. 26, 2014

(54) FISHING ACCESSORY CAPTURE APPARATUS

(76) Inventors: Blake Thomas Hudson, Wetumpka, AL (US); Jacob Aaron Gibbs, Baileyton, AL (US)

(*) Notice: Subject to any disclaimer, the term of this patent is extended or adjusted under 35 U.S.C. 154(b) by 266 days.

(21) Appl. No.: 13/455,726

(22) Filed: Apr. 25, 2012

(65) Prior Publication Data

US 2013/0283666 A1    Oct. 31, 2013

(51) Int. Cl.
*A01K 87/00*      (2006.01)

(52) U.S. Cl.
USPC .......................................... 43/25.2

(58) Field of Classification Search
USPC .............. 43/25.2, 25; D22/126, 134
See application file for complete search history.

(56) References Cited

U.S. PATENT DOCUMENTS

| | | | | |
|---|---|---|---|---|
| 2,028,477 A | * | 1/1936 | Rupp | 43/25.2 |
| D217,663 S | * | 5/1970 | Chamberlain | D22/134 |
| 4,667,433 A | * | 5/1987 | Thompson, Jr. | 43/25.2 |
| 5,172,509 A | * | 12/1992 | Motovik | 43/25.2 |
| 5,535,541 A | * | 7/1996 | Fisher | 43/57.1 |
| 5,956,884 A | | 9/1999 | Goodrich | |
| 6,408,563 B1 | | 6/2002 | Van Scoy | |
| 7,152,359 B1 | * | 12/2006 | Adams | 43/4.5 |
| 7,191,559 B1 | | 3/2007 | Laceky | |
| 7,216,454 B2 | | 5/2007 | Johnson et al. | |
| 8,046,952 B2 | | 11/2011 | Hillhouse et al. | |
| 8,407,928 B2 | * | 4/2013 | Brown et al. | 43/25.2 |
| 2005/0229472 A1 | * | 10/2005 | Jost | 43/25.2 |
| 2013/0185988 A1 | * | 7/2013 | McKenzie | 43/25.2 |

* cited by examiner

*Primary Examiner* — Christopher P Ellis

(57) ABSTRACT

A fishing accessory for capturing a fishing bait anchored to a fishing line. The fishing accessory comprises a bottom end having a curved surface configured to seat against a fishing rod, and a top end coupled to the bottom end defining a cavity, the cavity having a first open end proximal the back end configured to receive an anchored bait and a second open end proximal the front end configured to support and capture the anchored bait while allowing the anchored portion to extend therethrough. A channel, extending from at least one surface external of the cavity to at least one surface defined by the cavity, extends from the first open end to the second open end and allows for the anchored portion to pass therethrough when mounting and uncoupling the anchored wire bait at the second open end of the cavity.

18 Claims, 6 Drawing Sheets

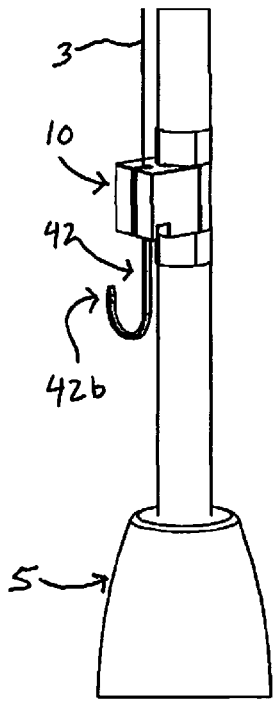
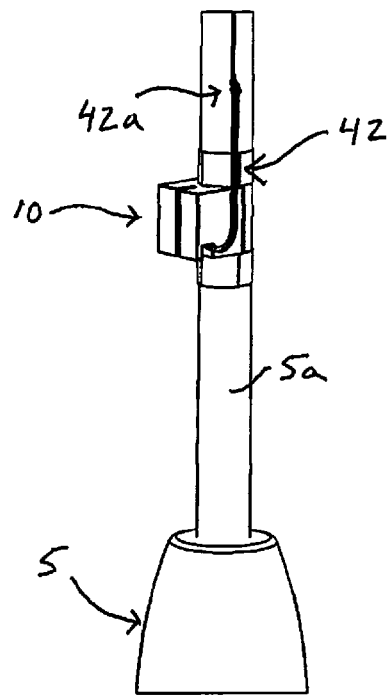
FIG. 11  FIG. 12
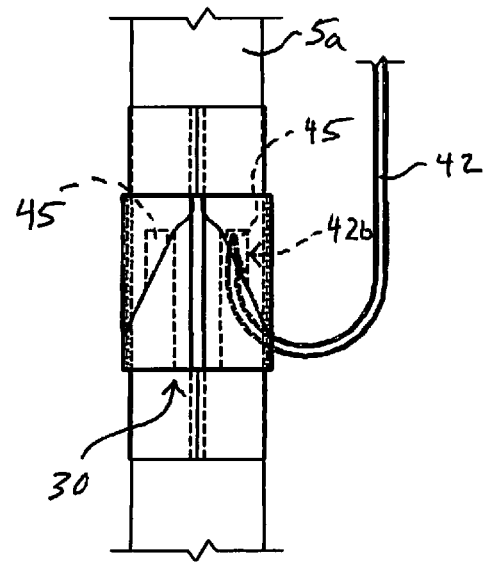
FIG. 13

FISHING ACCESSORY CAPTURE APPARATUS

TECHNICAL FIELD

The present invention relates generally to the field of fishing accessories, and more particularly to a fishing accessory configured mount to a fishing rod and capture a hook portion or an anchored portion of an anchored wire bait and/or anchored fishing lure, and methods the same.

BACKGROUND OF THE INVENTION

A spinner bait (commonly referred as a wire bait) anchored to the fishing line can bend easily when mounting the hook portion of the spinner bait to a portion of the fishing rod when the bait is not in use. Generally, the spinner bait is designed to run in the water wherein the blades of the bait generally spin directly over the skirted head (where the hook is hidden). The vibration of the blades is felt by the fish, causing the fish to mistake the flashing blades for a school of baitfish. Generally, fish feed or attempt to eat the bait by feeding upwards on the bait (generally swimming towards the top of the water). Thus, when the spinner bait is hit in an upward manner the fish grabs the headed skirt and is hooked. If the wire of the spinner bait is bent or twisted (due to improper stowing), the bait runs sideways or causes the entire bait to spin. When this happens, the chances of catching a fish are drastically reduced. This can be seen as a common drawback to using and/or stowing a wire bait. Accordingly, it can be seen that needs exist for a fishing accessory providing improved stowing and/or capturing capabilities.

SUMMARY OF THE INVENTION

In example embodiments, the present invention provides a fishing accessory capture apparatus for mounting to a fishing rod for capturing and retaining a portion of the bait, wherein the bait mounts to a fishing line extending from a reel mounted to the fishing rod, and wherein a portion of the bait is retained within a cavity when tension provided by rotating the reel is applied to the line.

In one aspect, the present invention is a fishing accessory comprising a bottom end having a curved surface extending between a front end and a back end, the curved surface configured to seat against a fishing rod, and a top end coupled to the bottom end defining a cavity extending between the front end and the back end, wherein the cavity has a first open end proximal the back end configured to receive an anchored bait and a second open end proximal the front end configured to support and capture the anchored bait while allowing the anchored portion to extend therethrough. A channel, extending from at least one surface external of the cavity to at least one surface defined by the cavity, extends from the first open end to the second open end and allows for the anchored portion to pass therethrough when mounting and uncoupling the anchored wire bait at the second open end of the cavity.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIG. 11 shows a perspective view of the example embodiment of FIG. 1 secured to a fishing rod, wherein an anchored portion of an anchored bait hook is contained within the cavity.

FIG. 12 is a perspective view of a fishing accessory according to a second example embodiment of the present invention, wherein a hook portion of an anchored bait hook is contained within an orifice of the cavity.

FIG. 13 is a detailed top view of the example embodiment shown in FIG. 12, showing the sharp tip portion of the bait hook contained within the orifice.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
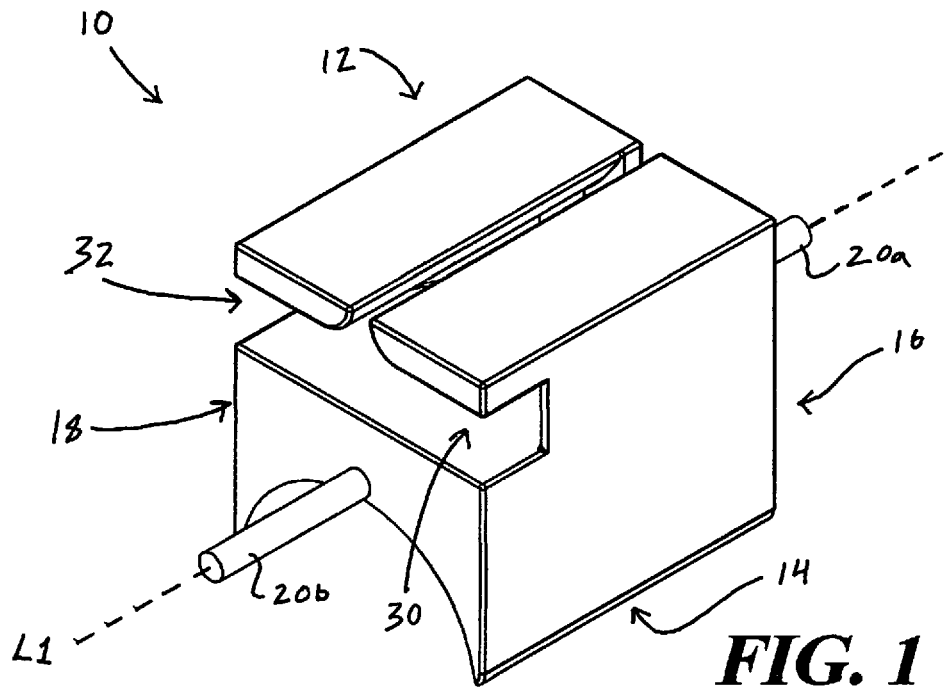
FIG. 1 is a perspective view of a fishing accessory according to an example embodiment of the present invention.
Figure 2:
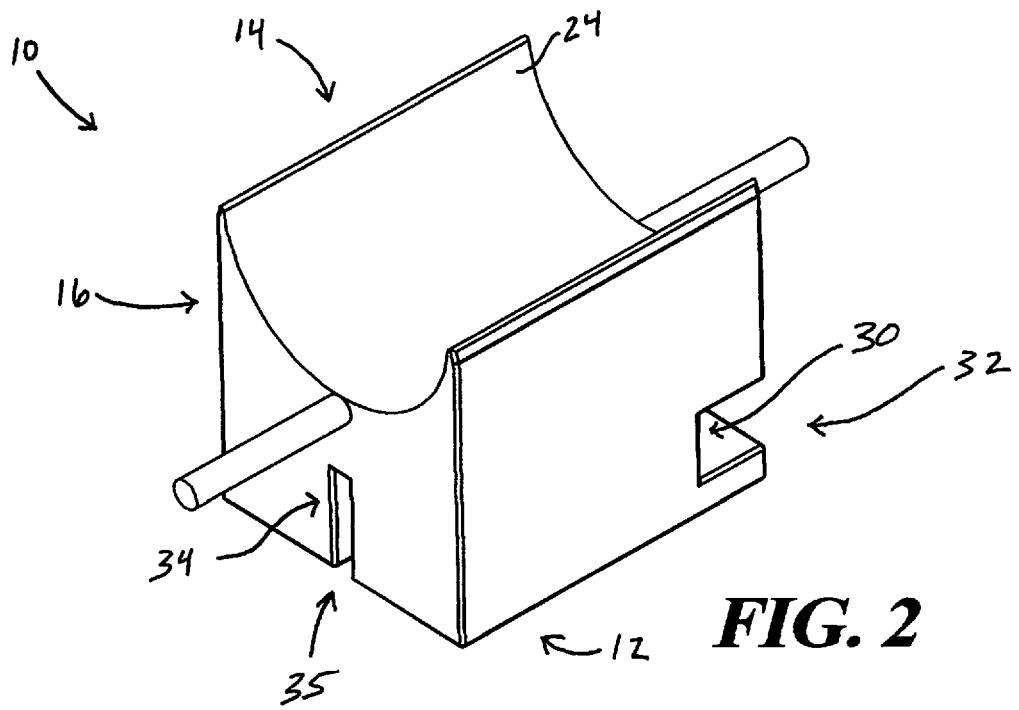
FIG. 2 is a bottom perspective view of the fishing accessory of FIG. 1.
Figure 4:
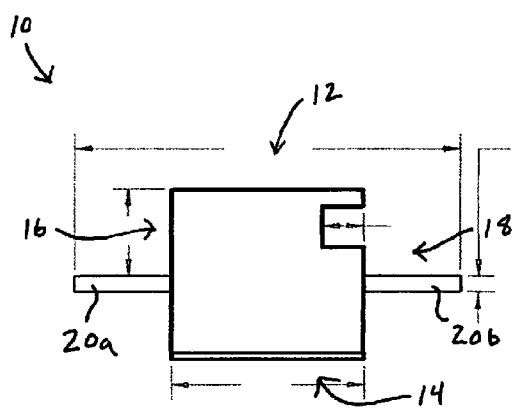
FIG. 4 shows a side view of the example embodiment shown in FIG. 1.
Figure 3:
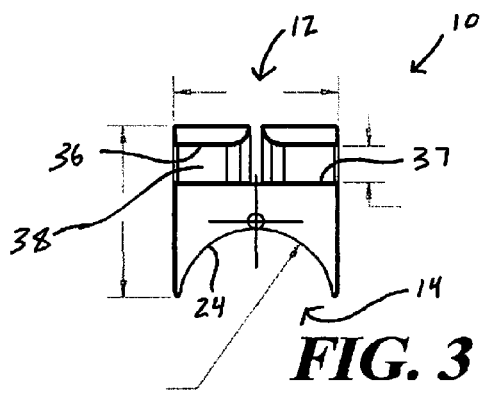
FIG. 3 shows the back end of the cavity of the second end of the example embodiment of FIG. 1.
Figure 5:
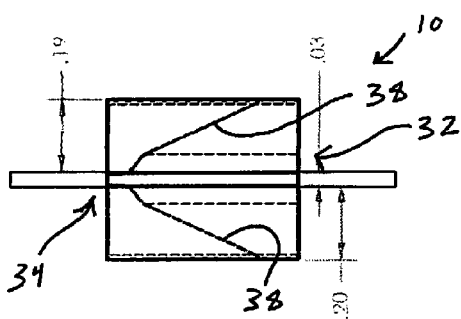
FIG. 5 shows the second end of the example embodiment shown in FIG. 1.
Figure 6:
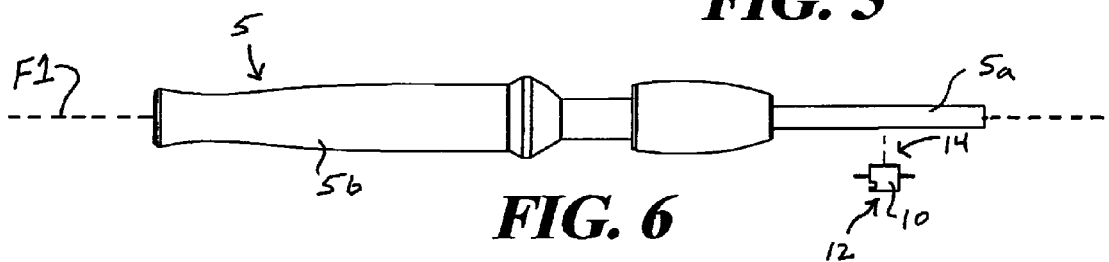
FIG. 6 is an exploded view of the fishing accessory of FIG. 1 and a fishing rod, before seating and mounting the accessory to the fishing rod.
Figure 7:
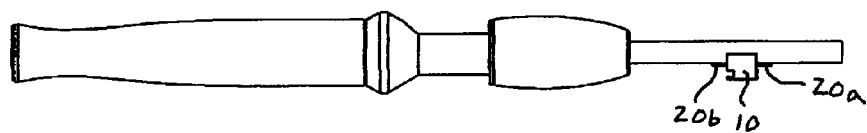
FIG. 7 shows a side view of the fishing accessory of FIG. 1 and a fishing rod, wherein the accessory is seated on the fishing rod.

With reference now to the drawing figures, wherein like reference numbers represent corresponding parts throughout the several views, FIGS. 1-5 show a fishing accessory capture apparatus 10 generally comprising a top end 12 for receiving and capturing an anchored wire bait, fishing hook, and/or fishing lure, and having a bottom end 14 generally opposite thereto for seating against and/or coupling to a fishing rod. The top end 12 and the bottom end 14 may be integrally formed (as depicted in the Figures) or separable wherein one or more coupling and/or connecting features are provided for coupling the ends (top and bottom) together. As depicted in FIGS. 1-2, the top and bottom ends 12, 14 generally extend along a longitudinal axis (see dotted line L1) from a front end 16 to a back end 18, wherein at least one rod or flange 20 (depicted as 20a and 20b) outwardly extends therefrom for permanently mounting the seated fishing accessory capture apparatus 10 to a fishing rod 5 (see FIGS. 6-8). In preferred embodiments, the fishing accessory 10 can be permanently secured to the fishing rod 5 by using the same techniques for securing a fishing rod eyelet (ring(s) having a mounting structure that's generally permanently mounted to a fishing rod for guiding the fishing line therethrough), for example, wherein thread or wire is wrapped tightly around the rod and the flanges 20a, 20b extending from the ends 16, 18 of the seated fishing accessory 10, and further coated in a resin for additional support and durability (see securing bands 6a, 6b). In additional example embodiments, other forms of securing the flanges 20a, 20b to the fishing rod may be provided by, but not limited to, adhesives, wraps, tapes, strings, ropes, couplings, pins, clips, screws, fasteners, snap-fit connectors, screw-together connectors, a other conventional connectors and/or connector assemblies, whether detachable for decupling or intended for one-time connection only.

Figure 8:
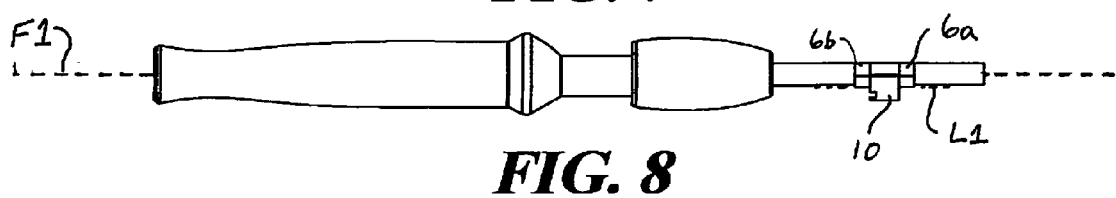
FIG. 8 shows a side view of the fishing accessory of FIG. 1 and a fishing rod, wherein the accessory is seated and secured to the fishing rod.

As generally depicted in FIGS. 1-5, the bottom end 14 comprises a non-linear surface 24 configured to generally conform and seat or couple to a portion of the fishing rod 5, wherein the non-linear surface 24 is substantially similar to an outside surface 5a of the fishing rod 5 for axially offsetting the longitudinal axis L1 from a longitudinal axis F1 generally extending the length of the fishing rod 5 (see FIG. 8). In example embodiments, the fishing accessory 10 can be mounted to any portion of the rod generally extending from the proximal end having a handle 5b to a distal end (not shown) generally having greater flexibility than the proximal end, and wherein the accessory 10 can mount at any angular position around the longitudinal axis F1. Preferably, when the fishing accessory 10 is seated on the fishing rod 5, at least a portion of the flange 20 (proximal the connecting ends, outer ends and/or therebetween) is planar with a portion of the non-linear surface 24 for providing the flanges 20a, 20b adequate surface area to contact the outside surface 5a when applying the securing bands 6a, 6b to permanently mount the fishing accessory 10 to the fishing rod 5.

Figures 9, 10:
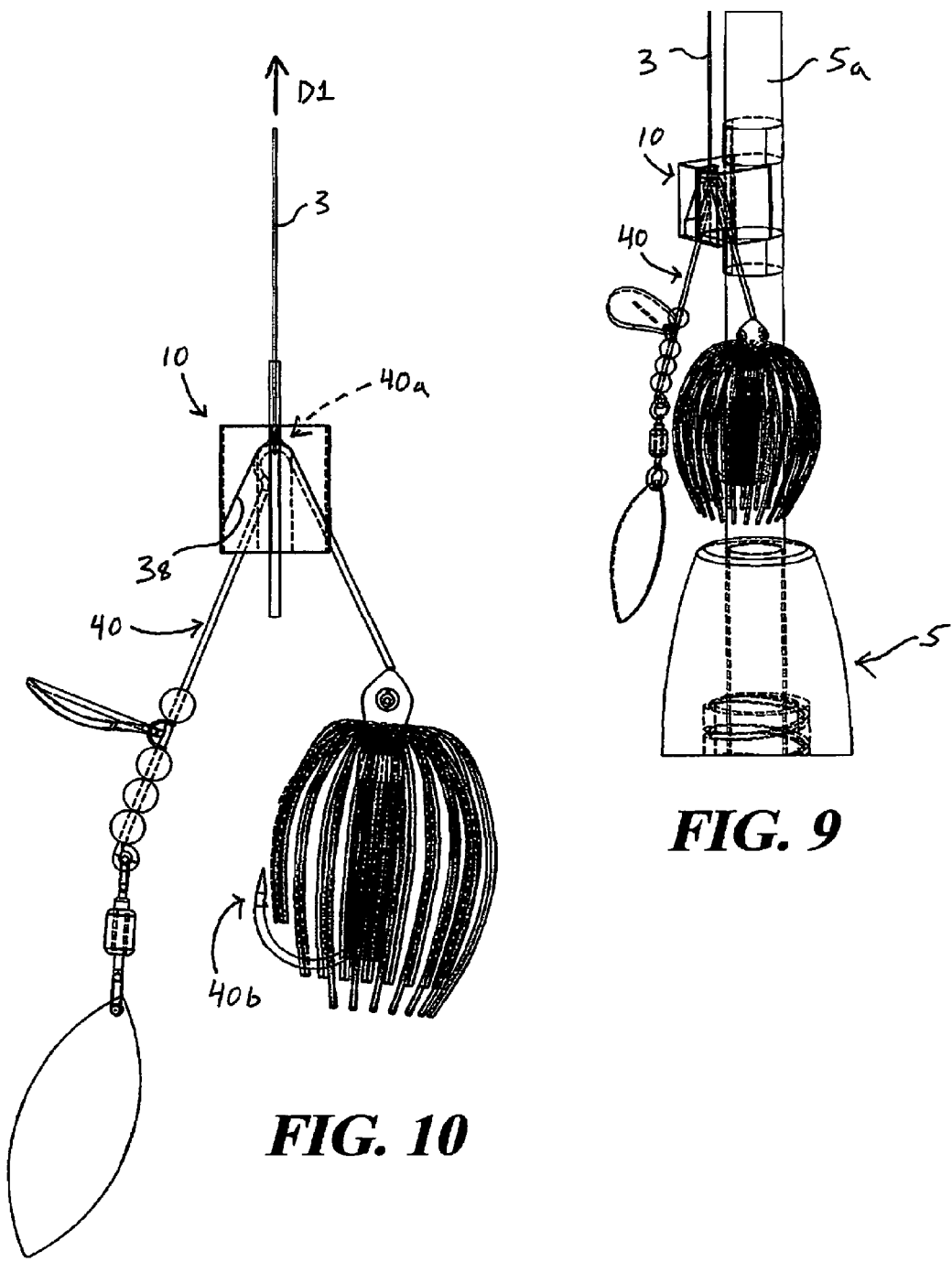
FIG. 9 shows a perspective view of the example embodiment of FIG. 1 secured to a fishing rod, wherein an anchored wire bait is contained within the cavity.
FIG. 10 shows a top view of the example embodiment of FIG. 9, wherein the fishing rod, mounting clips and portions of a skirt of the wire bait have been removed to show the hook.
Figure 14:
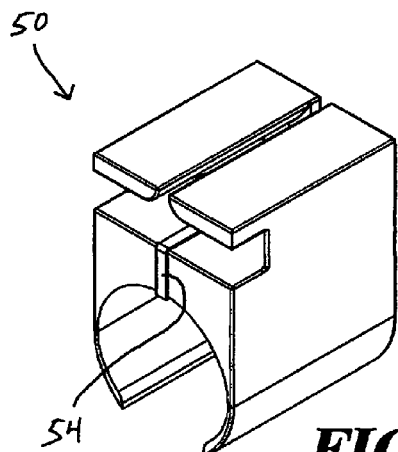
FIG. 14 shows a perspective view of a fishing accessory according to a third example embodiment of the present invention.
Figure 15:
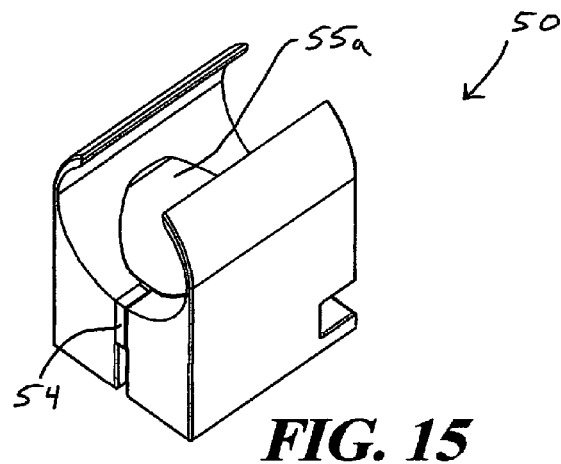
FIG. 15 shows a bottom perspective view of the example embodiment shown in FIG. 14.
Figure 16:
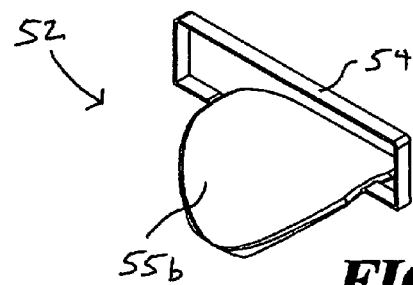
FIG. 16 shows a perspective view of portions of the example embodiment shown in FIG. 14.
Figure 17:
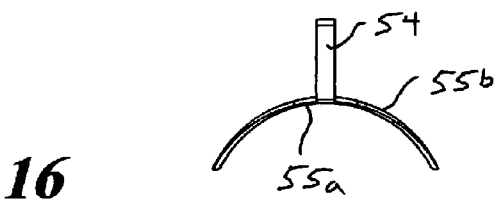
FIG. 17 shows a front end view of portions of the example embodiment shown in FIG. 14.
Figure 18:
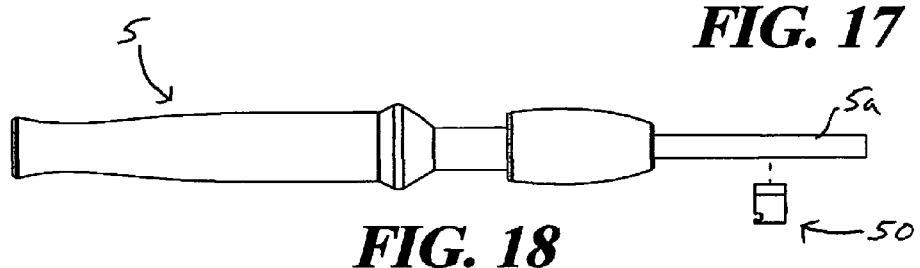
FIG. 18 is an exploded view of the fishing accessory of FIG. 14 and a fishing rod, before seating and mounting the accessory to the fishing rod.
Figure 19:
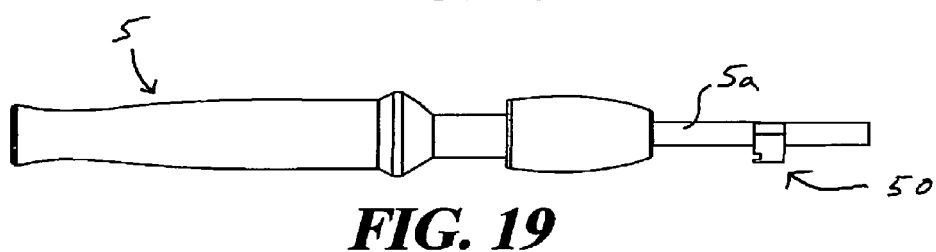
FIG. 19 shows a side view of the fishing accessory and the fishing rod of FIG. 14, wherein the accessory is seated and mounted to the fishing rod.

The top end 12 generally includes a cavity 30 having a first open end 32 near the back end 18 and a second open end 34 near the front end 16 for receiving and/or supporting and capturing an anchored wire bait 40. In general, the cavity 30 is defined by a top surface 36, a bottom surface 37 and a side surface 38, wherein the anchored wire bait 80 is contained within the cavity 30 and restricted to move by direct contact with at least one surface (36, 37, or 38). FIGS. 9-10 depict example embodiments of the fishing accessory 10 capturing and containing an anchored wire bait 40 generally having an anchor portion 40a and a hook portion 40b. As depicted, a fishing line 3 tied or mounted to the anchor portion 40a of the wire bait 40 applies tension in the direction D1, causing the anchor portion 40a of the wire bait 40 to seat against portions of the side surface 38, allowing the force resulting from applied tension to be distributed evenly along the anchor portion 40a. Preferably, the side, top and/or bottom surfaces can be shaped to accommodate a particular wire bait, for example, a buzz bait having an anchor portion and a hook portion and having a paddle-wheel like mechanism to spin when moving through water. Additionally, the wire bait 40 can be captured within the cavity from both sides, wherein the hook portion can extend from the right (as shown in FIG. 10) or left side of the cavity 30. In additional example embodiments, a lure or fish hook 42 having an anchored portion 42a and at least one hook portion 42b can be captured within the cavity 30. For example, when live bait to the hook portion for fishing, it may be desired to retain or capture the hook having the live bait mounted thereto until a later time (e.g. a walk around the pond to find a better fishing hole).

In additional example embodiments, a weight (generally shaped like a torpedo, bullet, oval or similar) mounted near or traversable to the anchor portion of the wire bait 40 or fishing hook 42, can be captured within the first open end 32 of the cavity 30, wherein the smallest portion of the weight is captured between the top and the bottom surfaces 36, 37 of the cavity 30. Optionally, an extrusion can be made the top, bottom and/or side surfaces to capture additional surface area of the anchored portion, weight, and/or portion of the bait mounted thereto. For example, a plastic worm, lizard or other form of artificial bait and/or live bait, can be coupled to the anchored portion (generally the part of the bait's body in front or leading when moving forward) and the hook portion (generally the mid section to upper and/or lower body of the bait behind the anchored portion when mounted thereto), wherein the anchored portion is captured by the first open end 32 of the cavity 30, and wherein a weight proximal the anchored portion can be captured by the same. In further example embodiments, the top, bottom and/or side surfaces 36, 37 and any outside surface near the ends of the accessory 10 may be shaped and/or formed to accommodate capturing both the anchored or hook portions of a substantial assortment of hooks, lures, wire baits (spinner bait, buzz bait, etc.), rigs (Texas rig, Alabama rig, etc.), jigs, rattle traps, and various other baits anchored to a fishing line for catching fish.

In yet additional example embodiments, an orifice 45 may be formed within at least one surface of the cavity for retaining the hook portion of a bait or hook (see FIG. 13). As shown, orifices 45 are formed within the side surface of the cavity 30, wherein the hook portion is retained within the orifice when tension is applied to the line.

FIGS. 14-19 show a third example embodiment of the present invention, wherein the fishing accessory 10 can be removably mountable for coupling and decoupling to the fishing rod 5. As depicted, the flanges are removed from the front and back ends, and the curved surface 24 generally extends downward and inward forming a spring to grasp the rod. A friction wrap 52, generally comprising a band 54 and a pad 55 (having contact surfaces 55a and 55b), may be optionally provided for frictional engagement between the accessory 50 and the outer surface 5a of the fishing rod 5 when the accessory 50 is mounted thereto. Optionally, the friction wraps can come in a plurality of other thicknesses to accommodate fishing rods of all sizes.

Figure 20:
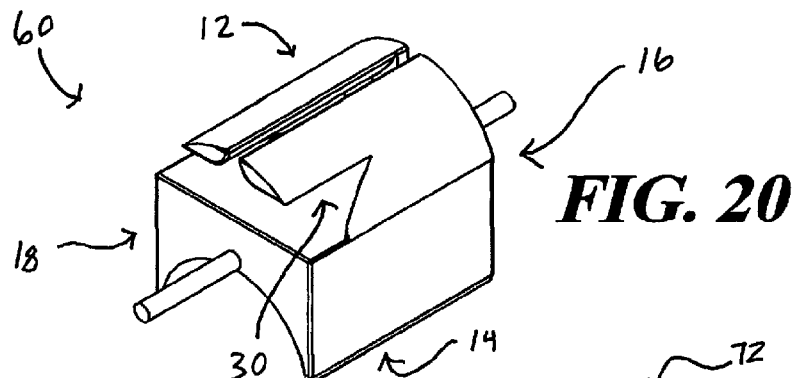
FIG. 20 is a perspective view of a fishing accessory according to a fourth example embodiment of the present invention.
Figure 21A:
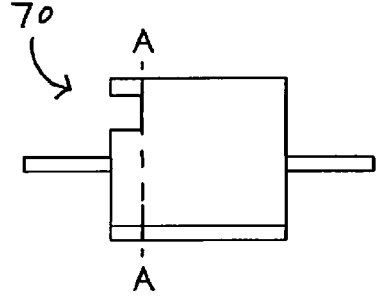
FIG. 21A is a side view of a fishing accessory according to a fifth example embodiment of the present invention.
Figure 21B:
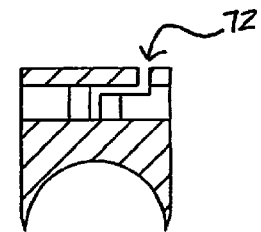
FIG. 21B shows a section view of the example embodiment shown in FIG. 21A along line A-A.
Figure 22A:
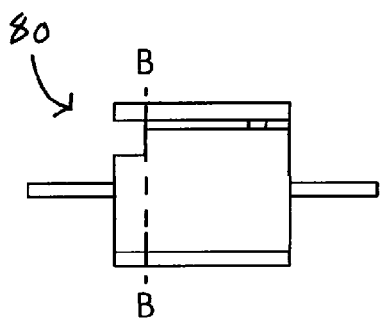
FIG. 22A is a side view of a fishing accessory according to a sixth example embodiment of the present invention.
Figure 22B:
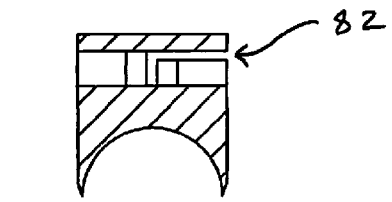
FIG. 22B shows a section view of the example embodiment shown in FIG. 22A along line B-B.
Figure 23A:
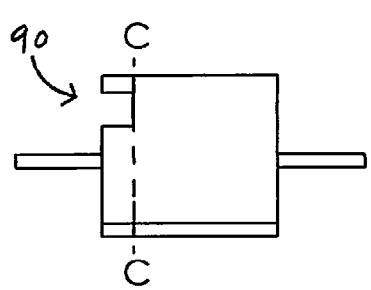
FIG. 23A is a side view of a fishing accessory according to a seventh example embodiment of the present invention.
Figure 23B:
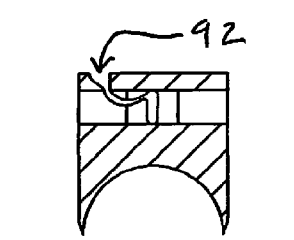
FIG. 23B shows a section view of the example embodiment shown in FIG. 23A along line C-C.

FIG. 20 shows a rounded fishing accessory 60 according to a fourth example embodiment of the present invention, wherein the outer surfaces of the top end 12 are curved to reduce catching any portion of the fishing line extending from the anchored portion by the accessory 20. In additional example embodiments, the outer surfaces of the ends (12, 14, 16 and 18) generally adjacent the surfaces 36, 37 and 38 may be sized, shaped and/or formed to reduce the likelihood of catching the fishing line by the accessory 10.

FIGS. 21a-23b show additional example embodiments of the present invention, wherein the channel 35 (see FIG. 2) may be in the form of a non-linear channels 72, 82 and 92 generally creating a path from the outer surface of at least one end through at least one surface of the cavity.

In commercial embodiments, the present invention can be constructed of materials including plastics, metals, composites, wood, and/or other available materials. In preferred embodiments, the fishing accessory is constructed of an injection moldable plastic. Preferably the friction wrap 52 is constructed of material(s) capable of increasing surface friction between the accessory 50 and the fishing rod. Optionally, the flanges may be replaced with a wire or rod for increased durability and strength. Optionally, the fishing accessory capture apparatus can be provided for users having little to no exterience with sharp objects (such as a hook) and/or fishing, for example children, wherein an actuatable pin is provided along an outside surface of one of the ends for moving within the cavity to contact a portion of a captured fishing bait, acting as a safety to prevent the bait from unintentionally removing from the cavity.

While the invention has been described with reference to preferred and example embodiments, it will be understood by those skilled in the art that a variety of modifications, additions and deletions are within the scope of the invention, as defined by the following claims.

What is claimed is:

1. A fishing accessory comprising:
    a bottom end comprising a curved surface extending between a front end and a back end, said curved surface configured to seat against a fishing rod; and
    a top end coupled to the bottom end defining a cavity extending between the front end and the back end, said cavity having a first open end proximal the back end configured to receive an anchored bait and a second open end proximal the front end configured to support and capture the anchored bait while allowing an anchored portion to extend therethrough, wherein a channel extending from at least one surface external of the cavity to at least one surface defined by the cavity extends from the first open end to the second open end and allows for the anchored portion to pass therethrough when mounting and unmounting the anchored bait at the second open end of the cavity.

2. The fishing accessory of claim 1, wherein at least one flange extends beyond the front or back ends of the curved surface for permanently securing the accessory to the fishing rod.

3. The fishing accessory of claim 1, wherein the curved surface of the bottom end downwardly and inwardly extends for removably mounting to the fishing rod.

4. The fishing accessory of claim 1, wherein at least one surface defining the cavity comprises at least one orifice configured to receive a hook when the hook is inserted into the first open end of the cavity.

5. The fishing accessory of claim 1, wherein the anchored bait is a wire bait.

6. The fishing accessory of claim 5, wherein the wire bait is a spinner bait.

7. The fishing accessory of claim 1, wherein the anchored bait is a fishing hook.

8. The fishing accessory of claim 1, wherein the first open end is configured to capture a weight.

9. The fishing accessory of claim 1, wherein the top end is configured to receive a pin for actuating within the cavity to contact the anchor portion or the hook portion of the fishing bait, wherein the fishing bait is restricted to move therefrom by contact with the pin.

10. A fishing accessory comprising:
    a bottom end comprising a curved surface extending between a front end and a back end, said curved surface configured to seat against a fishing rod; and
    a top end defining a cavity extending between the front end and the back end, said cavity having a first open end proximal the back end configured to receive an anchored bait and a second open end proximal the front end configured to support and capture the anchored bait while allowing an anchored portion to extend therethrough, wherein a channel extending from at least one surface external of the cavity to at least one surface defined by the cavity extends from the first open end to the second open end and allows for the anchored portion to pass therethrough when mounting and unmounting the anchored bait at the second open end of the cavity.

11. The fishing accessory of claim 10, wherein at least one flange outwardly extends from at least a portion of one of the ends for mounting the curved surface of the bottom end to a fishing rod.

12. The fishing accessory of claim 10, wherein the curved surface of the bottom end downwardly and inwardly extends for removably mounting to the fishing rod.

13. The fishing accessory of claim 10, wherein at least one surface defining the cavity comprises at least one orifice configured to receive a hook when the hook is inserted into the first open end of the cavity.

14. The fishing accessory of claim 10, wherein the anchored bait is a wire bait.

15. The fishing accessory of claim 14, wherein the wire bait is a spinner bait.

16. The fishing accessory of claim 10, wherein the anchored bait is a fishing hook.

17. The fishing accessory of claim 10, wherein the anchored portion is in the form of a fishing line, and wherein the fishing line is anchored to at least a portion of the bait and capable of passing through the channel.

18. The fishing accessory of claim 10, wherein the channel is generally linear.

\* \* \* \* \*